Figure 1:
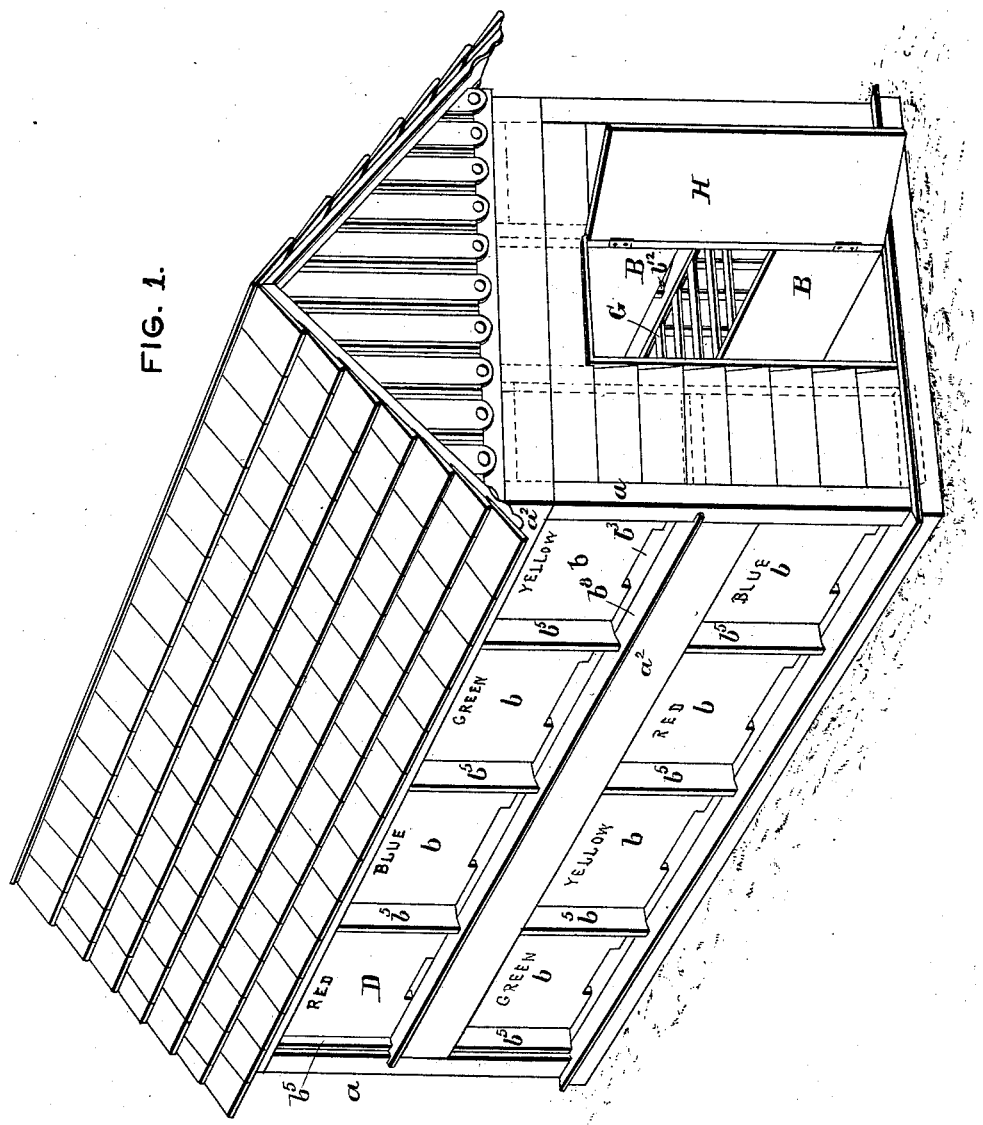

(No Model.)

2 Sheets—Sheet 1.

N. C. MITCHELL.
BEE HIVE.

No. 314,972.

Patented Mar. 31, 1885.

ATTEST-
J. Henry Kaiser
Geo. L. Wheelock

INVENTOR.
Nelson C. Mitchell
By E. M. Brutty
att.

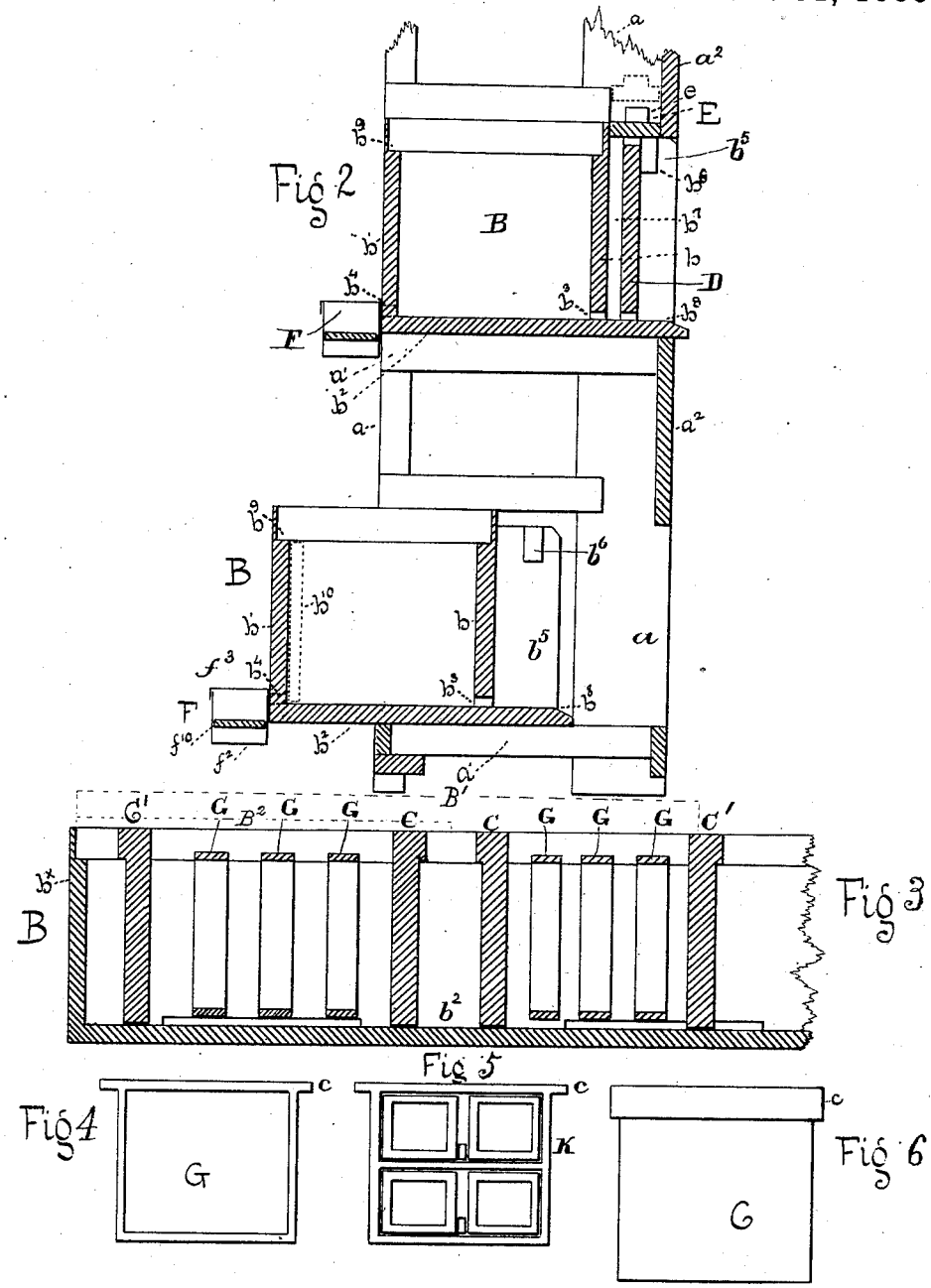

UNITED STATES PATENT OFFICE.

NELSON C. MITCHELL, OF KANSAS CITY, MISSOURI.

BEE-HIVE.

SPECIFICATION forming part of Letters Patent No. 314,972, dated March 31, 1885.

Application filed March 10, 1884. (No model.)

*To all whom it may concern:*

Be it known that I, NELSON C. MITCHELL, a citizen of the United States, and a resident of Kansas City, Missouri, have invented certain new and useful Improvements in Bee-Hives, of which the following is a specification.

The object of my invention is to provide a structure for the keeping of bees which will be especially adapted for carrying out my improved method of multiplying colonies of bees and prevention of swarming. The said method is not claimed herein, but is described and claimed in a divisional application filed January 21, 1885, No. 153,551.

My said general structure, which would come under the general name "bee-hive," but to which I apply the special name "bee-way," consists of one or more compartments, each adapted for the reception of an original colony of bees, and each provided with two entrances for the bees, and with removable division-boards and comb-frames, by which the compartment is subdivided, upon the subdivision of an original colony, into two sub-compartments, which I designate as "hives."

In the accompanying drawings, Figure 1 shows a house containing a number of bee-ways in tiers on its opposite sides. Fig. 2 is a transverse section of two ways placed one above the other in tiers, as shown in Fig. 1. Fig. 3 is a longitudinal section of a way; and Figs. 4, 5, and 6 show the division-board and comb-frames used in the way.

In Fig. 1 is shown a house, which may be entered at one end by a door, H. Upon the opposite inner sides of the house extend longitudinally the beeways B in tiers, two tiers being shown on each side. These ways consist each of a square trough, of the form in cross-section shown in Fig. 2, open at the top, and supported in any suitable manner on the sides of the house, each at a sufficient distance from the beeway directly above it, or from the roof, as the case may be, to permit free access to it from inside the house for inserting and removing comb-frames, and for other manipulations.

The comb-frames and division-board (shown in Figs. 4, 5, and 6) are adapted to be set transversely in the beeway B, being provided with lugs $c$ on each upper corner, that set into a rabbet or shoulder, $b^9$, in the two upper edges of the way.

A division-board, C', Fig. 3, divides each way B into two compartments, B'; but a way may consist of any desired number of compartments.

All comb-frames and division-boards are made removable, in order that the way may be readily cleaned by removing them and sweeping from one end to the other of the way.

Fig. 3 is a longitudinal cross-section of a compartment, B'. C' C' are the division-boards at the end of the compartment. C C are the division-boards set in to subdivide the compartment B' into hives B²; and G G, &c., are the comb-frames.

The outer wall of the way is designated by $b$, and when the ways are placed in a house, in the manner shown in Fig. 1, the wall $b$ constitutes also the wall of the house. It has been heretofore customary to place bee-hives on the inner side wall of a house by making the wall of the house additional to that inclosing the bees and comb, and the space between the two walls has afforded lodgment for bee-moth, ants, and other pests. The evils of such a construction I avoid by making the wall of the beeway also the wall of the house.

A storm-door, D, may be inserted in front of wall $b$, as shown in Fig. 2, to protect the bees from cold in winter, and from the too stimulating heat of the sun in early spring.

In winter I also place in the beeway a lining, $b^{10}$, Fig. 2, made of thin board covered with felt or like absorbent material, which is held in place by the division-boards, which, for the purpose, are of slightly-less width than those used in summer. A lining of this character has proved of great value in keeping the bees through the winter.

On the outside of the house is a projecting longitudinal ledge, $b^8$, corresponding to each tier of beeways B. These ledges form alighting-boards for the bees, and together with the vertical projecting boards $b^5$ divide the side of the house into porticoes, each of which is provided with an opening, $b^3$, forming an entrance for the bees into the way. There are two of these outside porticoes to each compartment of the beeway, or one for each sub compartment or hive. They are also painted each a different color, as indicated by the wording on Fig. 1, so that there will be for each compartment two differently-colored entrances. The object of this coloring, is, first, that the working-bees in the original colony may become accustomed to both colors and regard each one as their home; and, secondly, that after division the young bees may learn but the one color, and neither colony draw young bees from the other. I am aware that hives have been painted with distinctive colors; but never before has a single colony been provided with two differently-colored entrances, I having discovered that the young bees raised in the hive can be taught to distinguish between the colors, and so find their own home after division, and I am thus enabled by this discovery to obtain the results set forth.

A strip, $a^2$, flush with the outer edges of projecting boards $b^5$, is fastened above each tier of porticoes and forms the wall of the house for the space between the two tiers of beeways and above the upper tier. By reference to Fig. 2 it will be seen that there is left between the upper edge of wall $b$ and the lower edge of wall $a^2$ a space which is closed by a narrow horizontal strip, E. This strip E is easily removable, and when lifted gives entrance to light and air, and also affords an exit for the bees when it is desired to manipulate the contents of the beeway at any point, for the bees, when the way is opened from within, will naturally fly outward into the light and leave the operator free from danger or annoyance in his work.

F, Fig. 2, is a feeder, which may be used when necessary, and in the same figure one of the compartments is shown drawn inward, like a drawer, the floor of the way and the ledge $b^8$ being cut for that purpose. It is not, however, my preferred form.

In practicing my aforesaid method in the beeway above described, I first place my original colony in the middle of a compartment, B', bringing the division-boards C' and C' together, so as to just include the colony between them without closing either one of the two entrances $b^3$ leading into the compartment. The bees will then begin their work, the laboring-bees going in and out of the two differently-colored entrances indifferently, and becoming accustomed to regard either one as their home. When, now, by natural increase the colony has reached a size to warrant or demand division, I separate it into two parts, placing one part in one side of the compartment and the other part in the other side of the compartment, and then between the two subdivisions of the original colony I insert one or more division-boards C C. The old queen is placed with one subdivision and a new queen provided for the other, and the compartment is so divided as to give to each subdivision one of the two entrances $b^3$. The original compartment has thus been divided into two sub-compartments or hives, in each of which is now a new independent colony. The advantage of this process is that the old laboring-bees, having become accustomed to each of the two entrances, will continue to work for the two new colonies indifferently, so that neither one will suffer from want of food and care for the young bees and brood, as is likely to occur when the colony is divided into two widely-separated subdivisions, for in that case the old laborers will be disposed to work in their original home only, and to leave the new colony without food.

It is possible to treat each colony after division as an original colony for further subdivision; but in practice a single division only is advisable.

I am aware that bee-hives have been made extensible by means of movable partitions, so as to accommodate colonies of different sizes; and I am also aware that hive entrances have been painted in distinctive colors; but my combination of the features described, for the purpose specified, I claim as new.

What I claim, and desire to secure by Letters Patent, is—

1. The way or trough B, having one or more compartments, B', each of which is provided with two distinctively-marked entrances with longitudinally-adjustable division-boards C' C', rendering it extensible, so as to accommodate one or two colonies of bees, with removable comb-frames placed in a position accessible from both of said entrances, and with one or more division-boards, C C, and means for supporting them between the two entrances, whereby the multiplication of colonies is facilitated and swarming prevented, substantially as described.

2. The combination, with the inclosing-house, of the beeway or series of hives B on the walls of the house, accessible from within, and having the outer wall, $b$, of the way adjacent to the comb-frames, constituting the outer wall of the house.

3. The combination, with the way B, constituting a series of hives, of the inclosing-house, having an opening in its walls adjacent to each hive, and removable covers E for said openings, whereby the bees are led to fly outward upon the opening of the hive from within the house.

NELSON C. MITCHELL.

Witnesses:
L. B. BAILEY,
H. D. BAILEY.